Figure 1:
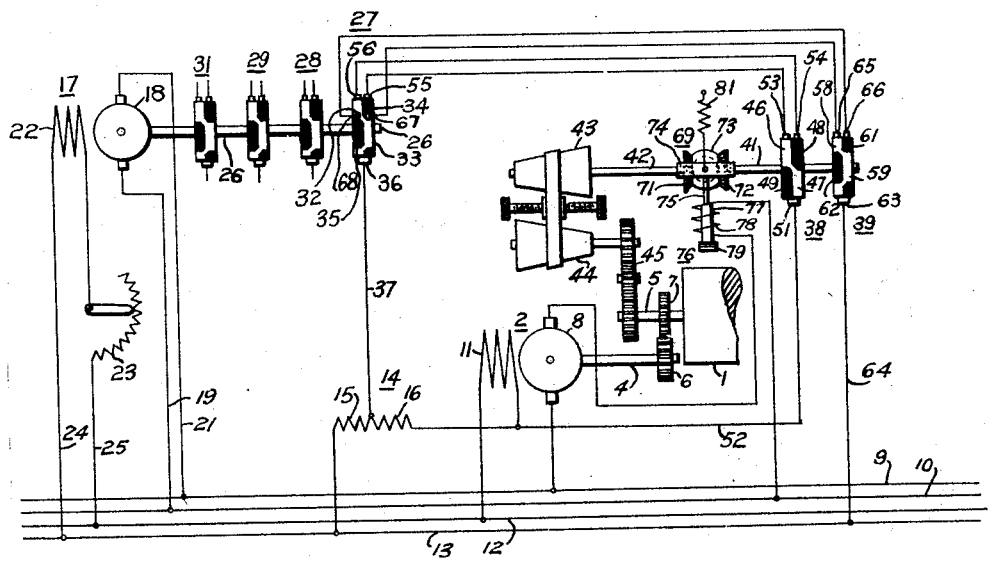

Oct. 16, 1928.

S. A. STAEGE 1,687,640

REGULATOR SYSTEM

Filed May 11, 1925

INVENTOR
Stepen A. Staege.
BY
ATTORNEY

Patented Oct. 16, 1928.

1,687,640

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed May 11, 1925. Serial No. 29,409.

My invention relates to regulator systems and more particularly to anti-hunting and quick-acting devices for regulator systems.

One object of my invention is to provide a regulator system of the rotary-contactor type employing means for accelerating the rate of regulation in accordance wth load changes upon the regulated machine and to prevent hunting action therein.

A further object of my invention is to provide means for compensating the regulation of a dynamo-electric machine for all load changes so as to maintain in cooperation the central parts of the respective working zones of the rotary contactors.

In describing one preferred embodiment of my invention, I have made use of the rotary contactor regulator disclosed in Patent No. 1,561,266, issued to Wm. E. Menzies, for speed regulator systems, on Nov. 10, 1925, and assigned to the Westinghouse Electric and Manufacturing Company, although any other suitable rotary contactor type of regulator may be used, such as that disclosed in my application, Serial #743,578, for regulator systems, filed Oct. 14, 1924 and assigned to the Westinghouse Electric and Manufacturing Company.

My invention comprises the use of a differential gear device located between the motor to be controlled and the master speed-reference means with which the speed of the controlled motor is compared. One preferred location for the differential gear device is between the controlled motor and the rotary contactors operated thereby. The rotary contactor is thus driven by the controlled motor through the differential gear device. The housing and the middle or planetary element of the differential gear device will not rotate except when there is a change in load on the controlled motor. A lever is attached to the housing or middle element of the differential gear device, and a tension means is attached to the lever for pulling upward against a weight. A solenoid is arranged to pull the lever down against the force of the tension member, this solenoid being energized in accordance with the load on the controlled motor.

The effect of a pull upon the solenoid is to vary the phase relation between the rotary contactors operated by the controlled motor and the motor itself, thereby giving the same effect to the regulating action as though the motor had actually increased or decreased its speed. It will be seen that, with this arrangement of quick-acting and anti-hunting devices, speed-correcting changes are made before the speed of the motor actually decreases or increases by reason of a change in load upon the motor. Such speed changes are anticipated and corrected to a substantial degree before the motor speed has actually changed. In the case of direct-current-motor drives for such service as steel-rolling mills or similar applications, where very sudden load changes of considerable magnitude take place, the quick-acting device herein described is very desirable.

Figure 2:
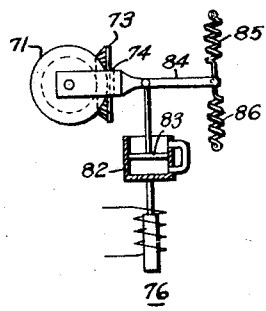
Figure 3:
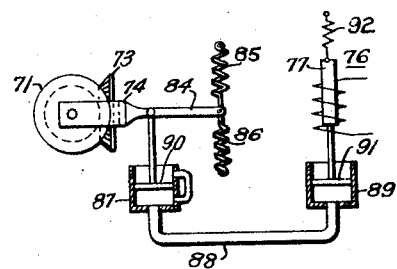

In the accompanying drawing, Fig. 1 is a diagrammatic view of apparatus and circuits embodying one preferred form of my invention;

Fig. 2 is a modification illustrating a movable dash-pot that is connected to the differential element to give a temporary correction thereto; and Fig. 3 is a modification illustrating the use of two stationary dash-pots connected together and designed to operate for a temporary correction.

Referring to the drawing, a roll 1 is driven by a direct-current motor 2 by means of shafts 4 and 5 and meshing gear-wheels 6 and 7. The motor 2 is provided with an armature winding 8 that is connected to variable-voltage, direct-current supply conductors 9 and 10, and with a field winding 11 that is energized from constant-voltage supply conductors 12 and 13. In circuit with the field winding 11 is connected a sectional resistor 14 having sections 15 and 16, the effective values of which are controlled in accordance with speed variations between the motor 2 and a master or reference motor 17. The motor 17 is provided with an armature winding 18, which is connected by means of leads 19 and 21 to the conductors 9 and 10, and a field winding 22 that is connected by means of leads 24 and 25 to the conductors 12 and 13 through a manually operable rheostat 23.

The master motor 17 drives a shaft 26 upon which are mounted a number of similarly constructed rotary contactors 27, 28, 29 and 31, which may be respectively connected to corresponding rotary contactors of several section-driving motors, the speed of which are to be controlled. For the sake of simplicity, the complete connections of only one of said contactors is shown.

Rotary contactor 27 comprises staggered conducting segments 32 and 33 that are electrically connected together, and staggered non-conducting segments 34 and 35, a smooth cylindrical contact surface being thus provided. A brush 36 is provided, of sufficient width to successively contact with each of the staggered conducting segments as the contactor revolves. This brush is connected by means of a lead 37 to the middle point of the resistor 14. Rotary contactors 38 and 39, which are similar in construction to the rotary contactor 27, are driven in accordance with the speed of the section motor 2 by means of shafts 41 and 42, co-operating cone pulleys 43 and 44 and gearing mechanisms 45, which is associated with shaft 5 of the roll 1.

The rotary contactor 38 is provided with staggered conducting segments 46 and 47 and staggered non-conducting segments 48 and 49. A brush 51 of sufficient width to successively engage each of these conducting segments is connected, by means of a lead 52, to the outer end of the resistor section 16. Two smaller alined brushes 53 and 54 are provided, each alternately engaging a conducting and a non-conducting segment of the contactor. Brushes 53 and 54 are respectively connected to similar brushes 55 and 56 that engage the corresponding conducting and non-conducting segments of the rotary contactor 27.

The rotary contactor 39 is similar in construction to the rotary contactor 38, and is provided with staggered non-conducting segments 58 and 59 and staggered non-conducting segments 61 and 62 and with a brush 63 of sufficient width to successively engage these conducting segments. The brush 63 is connected, by means of a lead 64 and a portion of the conductor 13, to the outer end of the resistor section 15. Alined narrow brushes 65 and 66 are provided for alternately engaging a conducting and a non-conducting segment of the contactor, and are respectively connected to brushes 67 and 68 of the contactor 27.

The differential mechanism 69 is here shown as connected between the shafts 41 and 42 and comprises bevel gear wheels 71 and 72 that are driven by the shafts and engage a bevel gear-wheel 73 that comprises the middle or planetary element of the differential mechanism. The gear-wheel 73 is mounted upon a housing 74 which may be rotated by means of a solenoid 76 to cause a difference in phase relation between the end gears 71 and 72. For this purpose, a rod 75 is connected to the housing 74 and to the armature 77 of the solenoid 76. The solenoid 76 further comprises an actuating winding 78 that is connected in series-circuit relation with the armature of the motor 2. A weight 79 is provided on the armature 77 and may be varied so that the setting of the differential mechanism may be adjusted. The force of the weight 79 is opposed by a tension member 81.

In Fig. 2, a modification of the invention comprising a yielding connection for actuating the differential element is illustrated, a dash-pot 82 being directly connected to the armature of the solenoid 76. A piston 83 of the dash-pot is connected, by means of a lever 84, to the housing 74 of the differential mechanism. Opposing springs 85 and 86 are attached to the end of the lever 84 to normally retain the same in a fixed position.

In Fig. 3 of the drawing, a further modification is illustrated which comprises dash-pots 87 and 89 that are hydraulically connected by means of a pipe 88. A piston 90 of one of the dash-pots is connected to the housing 74, and a piston 91 of the other dash-pot is connected to the solenoid armature 77, the weight of which is opposed by a tension member 92. It will be noted that, in this device, the action of the solenoid is downwardly rather than upwardly as in the other modifications.

The operation of my invention is as follows: The effective value of the resistor 14 is controlled by intermittently short-circuiting the resistor sections 15 and 16 through the rotary contactors 27, 38 and 39. As previously described, the section 15 is connected between the brush 36 of the rotary contactor 27 and the brush 63 of the rotary contactor 39. The several conducting segments of the rotary contactors are connected together at all times so that the potential of the conducting segments of the contactor 27 corresponds to the potential of the middle point of the resistor 14, and the potential of the conducting segments of the contactor 39 corresponds to that at the end of the resistor section 15.

It will be seen, therefore, that, if the phase relation between the contactors 27 and 39 changes in such manner that the brush 65 engages a conducting segment at the same time that the brush 67 engages a conducting segment, the circuit will be closed through these brushes to short-circuit resistor 15. If the phase relation between the rotary contactors 27 and 39 changes in such manner that the brushes 68 and 67 respectively engage a conducting segment and disengage a conducting segment at the same time that the brushes 66 and 65 engage with, and are disengaged from, conducting segments, there will be a continuous short-circuit of the resistor section 15, half of the time through the brushes 65 and 67 and the other half of the time through brushes 66 and 68. If, however, the phase relation between the rotary contactors 27 and 39 changes in such manner that the brush 65 engages with a conducting segment at the same moment that the brush 67 is disengaged from a conducting segment, the circuit through these brushes will be interrupted, as will be the circuit through brushes 66 and 68, so that the resistor section 15 will not be short-circuited any of the time. At any intermediate phase relation between the rotary contactors 27 and 39, there will be a proportional period of time during which the resistor section will be intermittently short-circuited and open-circuited.

The rotary contactors 27 and 38 operate to control the effective value of the resistor section 16 in the same way that the contactors 27 and 39 control the effective value of the resistor section 15. It will be seen, therefore, that the effective value of the resistor 14 is dependent upon the phase relations of the rotary contactors 38 and 39 with respect to the master contactor 27.

Under normal conditions of operation, an increase in load upon the motor 2 will cause the motor to slow down and, in slowing down, the phase relation of the contactors 38 and 39, with respect to the master 27 will be varied, thus giving a synchronous-motor characteristic to the motor 2.

In the use of my present invention, as a load comes upon the motor 2, such as will cause the motor to slow down, the coil 78, which is connected in series-circuit relation with the motor armature, receives an increased energization, thus causing the lever 84 to be pulled down and causing the phase relation between the shafts 41 and 42 to be changed, thereby imparting a corrective effect to the regulator action before an actual drop in motor speed has occurred. Thus, the amount of correction responsive to actual variations in motor speed may be very slight, depending upon the accuracy of the adjustment of the differential mechanism.

In some installations, it is preferable to have the corrective effect a temporary one only, allowing the variations in motor speed to determine the more permanent corrective effects. In such cases the yielding connections illustrated in Figs. 2 and 3 may be used, so that a change in load upon the motor 2 will cause a change in setting of the differential device 69 that has a temporary effect only, permitting the lever 84 to again assume its normal position by the action of the springs 85 and 86, as the fluid in the dash-pot leaks past the piston.

A sudden increase in load upon the motor being controlled will cause an increase in the pull of the solenoids 76 that will very quickly increase the angular displacement of the section rotary contactors 38 and 39 behind the position of the master rotary contactor 27, thereby inserting additional effective resistance in the field-winding circuit of the motor before the motor has changed its speed an appreciable amount, in this way tending to correct the motor field excitation and prevent a change in the motor speed armature displacement of the motor.

Assuming, for example, that an angular displacement of the rotary contactor amounting to 10° is required to compensate for an increase in load upon the motor 2, and assuming that the pull of the solenoid 76, by reason of the increased load, is just sufficient to make a 10° displacement of the rotary contactors, then no actual falling back in angular position of the motor armature 2 will be required to maintain it at the correct speed. If, however, the pull of the solenoid is not quite sufficient to fully compensate the change in load, then the motor armature will fall back in angular displacement sufficiently to make up the difference between the corrective effect required and the corrected effect given by the solenoid action. On the other hand, if the pull on the solenoid were more than sufficient to compensate for the increased load, the motor armature would advance its position to compensate for the difference, whereas, without the quick-acting differential system herein employed, the armature of the motor would have to be displaced the full amount required by the rotary contactors to insert the additional resistance into the shunt field circuit of the motor in order to make the correction required by the additional load upon the motor.

Not only will this device compensate for changes in load upon the motor, but it will tend to maintain in cooperation the central parts of the respective working zones of the section and master rotary contactors. This result is accomplished by so designing the spring, weight, and solenoid that the movement of the differential housing will be such an amount as to compensate for the droop in the motor load-speed characteristic. In this way, the phase relation between the section motor 2 and the master motor 17 may be maintained constant regardless of the load upon the section motor.

Many modifications in the arrangement and location of parts may be made within the spirit of my invention, and I do not wish to be limited other than by the scope of the appended claims.

I claim as my invention:

1. In a regulator system, a dynamo-electric machine, means for varying the excitation of said dynamo-electric machine comprising rotary-contactor means actuated in accordance with the speed of said machine, and means for varying the phase relation between said machine and said rotary-contactor means in accordance with the load on said machine.

2. In a regulator system, a dynamo-electric machine, means for varying the excitation of said machine comprising rotary-contactor means connected to said machine, differential means connected between said machine and said rotary contactor, and means for actuating said differential means in accordance with the load on said machine.

3. In a regulator system, a dynamo-electric machine, rotary-contactor means for varying the excitation of said machine, means for actuating said rotary contactor in accordance with the speed of said machine, and means for modifying the actuation of said rotary contactor in accordance with the load on said machine.

4. In a regulator system, a dynamo-electric machine, means for varying the excitation of said machine comprising a rotary contactor actuated in accordance with the speed of said dynamo-electric machine, and means for varying the phase relation between said dynamo-electric machine and said rotary contactor.

5. In a regulator system, a dynamo-electric machine, means for varying the excitation of said machine comprising a rotary contactor actuated in accordance with the speed of said dynamo-electric machine, differential means connected between said machine and said rotary contactor, and means actuated in accordance with the load on said machine for actuating said differential device to modify the action of said rotary contactor.

6. In a regulator system, a dynamo-electric machine, means for varying the excitation of said machine comprising a rotary contactor actuated in accordance with the speed of said dynamo-electric machine, differential means connected between said machine and said rotary contactor, and electro-responsive means being actuated in accordance with the load on said machine for actuating said differential means.

7. In a regulator system, a dynamo-electric machine, means for varying the excitation of said machine comprising a rotary contactor actuated in accordance with the speed of said dynamo-electric machine, a differential device connected between said machine and said rotary contactor, means for normally biasing said differential device to a predetermined position, and means actuated in accordance with the load on said machine for temporarily actuating said differential device.

8. In a regulator system, a dynamo-electric machine, means for varying the excitation of said machine comprising a rotary contactor actuated in accordance with the speed of said dynamo-electric machine, a differential device connected between said machine and said rotary contactor, means for normally biasing said differential device to a predetermined position, means actuated in accordance with the load on said machine, and a yielding connection between said actuating means and said differential device for temporarily actuating said differential device.

9. In a regulator system, a dynamo-electric machine, means for varying the excitation of said machine comprising a rotary contactor actuated in accordance with the speed of said dynamo-electric machine, differential means connected between said machine and said rotary contactor, electroresponsive means actuated in accordance with the load on said machine, and means forming a yielding connection between said electroresponsive means and said differential means for temporarily actuating said differential means.

10. In a regulator system, a dynamo-electric machine, means for varying the excitation of said machine comprising a rotary contactor actuated in accordance with the speed of said dynamo-electric machine, differential means connected between said machine and said rotary contactor, means for normally biasing said differential means to a predetermined position, electroresponsive means actuated in accordance with the load on said machine, and a yielding connection between said electroresponsive means and said differential means for temporarily actuating said differential means.

In testimony whereof, I have hereunto subscribed my name this 29th day of April, 1925.

STEPHEN A. STAEGE